US011349705B2

(12) United States Patent
Kawai et al.

(10) Patent No.: US 11,349,705 B2
(45) Date of Patent: May 31, 2022

(54) CONTROL SYSTEM AND CONTROL METHOD

(71) Applicant: Hitachi, Ltd., Tokyo (JP)

(72) Inventors: Hidehiro Kawai, Tokyo (JP); Hideki Osonoi, Tokyo (JP); Hidenori Omiya, Tokyo (JP)

(73) Assignee: HITACHI, LTD., Tokyo (JP)

( * ) Notice: Subject to any disclaimer, the term of this patent is extended or adjusted under 35 U.S.C. 154(b) by 16 days.

(21) Appl. No.: 17/137,091

(22) Filed: Dec. 29, 2020

(65) Prior Publication Data

US 2021/0243071 A1 Aug. 5, 2021

(30) Foreign Application Priority Data

Jan. 31, 2020 (JP) .............................. JP2020-014243

(51) Int. Cl.
*H04L 41/0654* (2022.01)
*H04L 12/40* (2006.01)
*H04L 12/46* (2006.01)
*H04L 43/0811* (2022.01)

(52) U.S. Cl.
CPC .... *H04L 41/0654* (2013.01); *H04L 12/40176* (2013.01); *H04L 12/462* (2013.01); *H04L 43/0811* (2013.01)

(58) Field of Classification Search
CPC ........... H04L 41/0654; H04L 12/40176; H04L 12/462; H04L 43/0811
See application file for complete search history.

(56) References Cited

U.S. PATENT DOCUMENTS

| 5,526,358 | A | * | 6/1996 | Gregerson | .............. | H04L 45/26 |
| | | | | | | 709/209 |
| 6,304,546 | B1 | * | 10/2001 | Natarajan | ............... | H04L 29/06 |
| | | | | | | 370/231 |
| 2006/0262762 | A1 | * | 11/2006 | Cho | ....................... | H04W 48/08 |
| | | | | | | 370/338 |

(Continued)

FOREIGN PATENT DOCUMENTS

| JP | H11-353255 A | 12/1999 |
| JP | 2012-113545 A | 6/2012 |
| WO | 2018/037535 A1 | 3/2018 |

OTHER PUBLICATIONS

Harada, M. et al. "Shinkansen Traffic Management System for Mutual Direct Operation of Sanyo Shinkansen and Kyushu Shinkansen" Hitachi Review, 2012, pp. 331-335, vol. 61, No. 7.

*Primary Examiner* — Christopher M Crutchfield
*Assistant Examiner* — Tito Q Pham
(74) *Attorney, Agent, or Firm* — Procopio, Cory, Hargreaves & Savitch LLP

(57) ABSTRACT

A route failure and a device failure are detected in a short time without erroneous recognition. A multiplexing system includes: a first system having a pair of processing devices forming a pair; a second system having a pair of processing devices forming a pair that are different from the first system; each processing device of the first system and the second system includes a survival monitoring unit configured to monitor a failure of the each processing device or the each LAN based on a device time-out for confirming survival of the each processing device and a route time-out for confirming survival of the each LAN set to be longer than the device time-out.

8 Claims, 8 Drawing Sheets

SURVIVAL INFORMATION TABLE 401

| MONITORING TARGET (DEVICE AND ROUTE) | | SURVIVAL TIME | MONITORING CYCLE | TIME-OUT COUNTER | |
|---|---|---|---|---|---|
| | | | | INITIAL VALUE | CURRENT VALUE |
| DEVICE 101 (OWN DEVICE) | — | 10 | — | — | — |
| DEVICE 102 | DEVICE 102 | 8 | 2 | 14 | 12 |
| | INTER-PAIR LAN 103 | 8 | 2 | 20 | 18 |
| | INTERNAL LAN 104 | 5 | 5 | 40 | 35 |
| | EXTERNAL LAN 105 | 5 | 10 | 80 | 75 |
| DEVICE 111 | DEVICE 111 | 5 | 5 | 30 | 25 |
| | INTER-SYSTEM LAN 106 | 5 | 5 | 40 | 35 |
| | INTERNAL LAN 104 | 5 | 5 | 40 | 35 |
| | EXTERNAL LAN 105 | 5 | 10 | 80 | 75 |
| DEVICE 112 | DEVICE 112 | 5 | 5 | 30 | 25 |
| | INTER-SYSTEM LAN 106 | 5 | 5 | 40 | 35 |
| | INTERNAL LAN 104 | 5 | 5 | 40 | 35 |
| | EXTERNAL LAN 105 | 5 | 10 | 80 | 75 |

(56) References Cited

U.S. PATENT DOCUMENTS

| | | | |
|---|---|---|---|
| 2007/0273509 A1* | 11/2007 | Gananathan | H05B 47/19 |
| | | | 340/540 |
| 2010/0074236 A1* | 3/2010 | Takeda | H04W 24/04 |
| | | | 370/338 |
| 2015/0341447 A1* | 11/2015 | Patil | H04L 67/16 |
| | | | 370/329 |
| 2019/0124145 A1* | 4/2019 | Doi | H04L 41/5012 |
| 2020/0067761 A1* | 2/2020 | Schmitt | H04L 43/10 |
| 2020/0162283 A1* | 5/2020 | Mo | H04L 43/10 |
| 2021/0144068 A1* | 5/2021 | Mo | H04L 12/4633 |
| 2021/0243071 A1* | 8/2021 | Kawai | H04L 43/0817 |

* cited by examiner

FIG. 4

SURVIVAL INFORMATION TABLE 401

| MONITORING TARGET (DEVICE AND ROUTE) | | SURVIVAL TIME | MONITORING CYCLE | TIME-OUT COUNTER | |
|---|---|---|---|---|---|
| | | | | INITIAL VALUE | CURRENT VALUE |
| DEVICE 101 (OWN DEVICE) | | — | 10 | — | — | — |
| DEVICE 102 | DEVICE 102 | 8 | 2 | 14 | 12 |
| | INTER-PAIR LAN 103 | 8 | 2 | 20 | 18 |
| | INTERNAL LAN 104 | 5 | 5 | 40 | 35 |
| | EXTERNAL LAN 105 | 5 | 10 | 80 | 75 |
| DEVICE 111 | DEVICE 111 | 5 | 5 | 30 | 25 |
| | INTER-SYSTEM LAN 106 | 5 | 5 | 40 | 35 |
| | INTERNAL LAN 104 | 5 | 5 | 40 | 35 |
| | EXTERNAL LAN 105 | 5 | 10 | 80 | 75 |
| DEVICE 112 | DEVICE 112 | 5 | 5 | 30 | 25 |
| | INTER-SYSTEM LAN 106 | 5 | 5 | 40 | 35 |
| | INTERNAL LAN 104 | 5 | 5 | 40 | 35 |
| | EXTERNAL LAN 105 | 5 | 10 | 80 | 75 |

FIG. 5

SURVIVAL INFORMATION 501

| TRANSMISSION SOURCE | DEVICE 101 |
|---|---|
| SURVIVAL TIME | 10 |

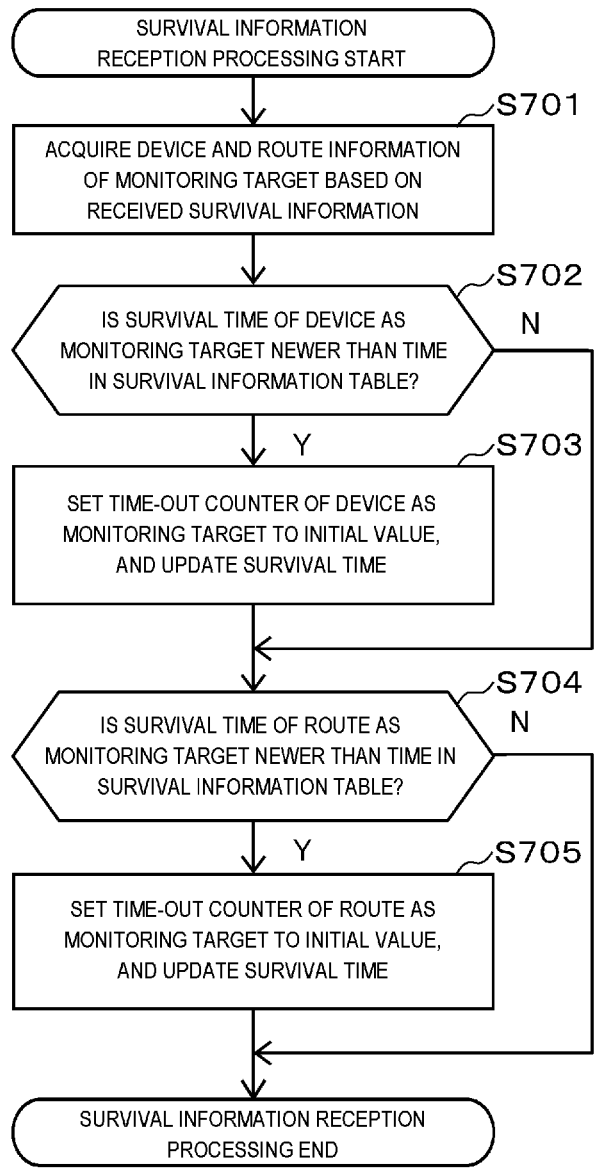

FIG. 8

ACTION DETERMINATION TABLE 801 BY FAILURE SITE

| FAILURE SITE | | ACTION |
|---|---|---|
| OWN DEVICE (8011) | OWN DEVICE | STOP PAIR IN OWN SYSTEM |
| PAIR DEVICE (8012) | PAIR DEVICE | FORCIBLY STOP PAIR DEVICE AND STOP OWN DEVICE |
| | INTER-PAIR LAN | STOP OWN DEVICE AND PAIR DEVICE |
| | INTERNAL LAN | STOP OWN DEVICE AND PAIR DEVICE |
| | EXTERNAL LAN | STOP OWN DEVICE AND PAIR DEVICE |
| DEVICE OF OTHER SYSTEM (8013) | DEVICE OF OTHER SYSTEM | FORCIBLY STOP PAIR IN OTHER SYSTEM |
| | INTER-SYSTEM LAN | — |
| | INTERNAL LAN | STOP OTHER SYSTEM |
| | EXTERNAL LAN | — |

SURVIVAL INFORMATION TABLE 1001

| MONITORING TARGET (DEVICE AND ROUTE) | | SURVIVAL TIME | MONITORING CYCLE | OFFSET | TIME-OUT COUNTER | |
|---|---|---|---|---|---|---|
| | | | | | INITIAL VALUE | CURRENT VALUE |
| DEVICE OF OTHER SYSTEM | DEVICE OF OTHER SYSTEM | 14 | 5 | — | 30 | 29 |
| | INTER-SYSTEM LAN | 14 | 5 | 4 | 40 | 39 |
| | INTERNAL LAN 1 | 10 | 5 | 0 | 40 | 35 |
| | INTERNAL LAN 2 | 11 | 5 | 1 | 40 | 36 |
| | EXTERNAL LAN 1 | 12 | 5 | 2 | 40 | 37 |
| | EXTERNAL LAN 2 | 13 | 5 | 3 | 40 | 38 |

CONTROL SYSTEM AND CONTROL METHOD

BACKGROUND OF THE INVENTION

1. Field of the Invention

The present invention relates to a control system and a control method of a multiplexing system.

2. Description of the Related Art

In the related art, there is a technique of monitoring a survival status between devices and a survival status of routes that make up a multiplexing system and performing fallback or system switching when an abnormality is detected. For example, in WO 2018/037535 (Patent Literature 1), a failure site is determined based on a survival notification from a plurality of routes, and a stop target is determined according to the site.

In Patent Literature 1, survival monitoring is performed between facilities via a plurality of routes, survival information managed by each facility is collected, a network failure and a facility failure are distinguished to detect the failure, and appropriate facilities are stopped according to a location of the failure. However, the technique is premised on a cloud environment, and there is no mention of a method of detecting a route failure and a device failure in a short time without erroneous recognition.

SUMMARY OF THE INVENTION

An aspect of the invention is to provide a control system and a control method capable of detecting a route failure and a device failure in a short time without erroneous recognition.

A control system according to an aspect of the invention is provided. In the control system of a multiplexing system, the multiplexing system includes: a first system having a pair of processing devices forming a pair; a second system having a pair of processing devices forming a pair that are different from the first system; a first inter-pair LAN directly connecting the pair of processing devices of the first system; a second inter-pair LAN directly connecting the pair of processing devices of the second system; a first inter-system LAN directly connecting one processing device of the pair of processing devices of the first system and one processing device of the pair of processing devices of the second system; a second inter-system LAN directly connecting another processing device of the pair of processing devices of the first system and another processing device of the pair of processing devices of the second system; an internal LAN connected to receive a processing result from a computing node provided on an internal side of the multiplexing system and perform a predetermined processing and connecting each pair of processing devices of the first system and the second system; and an external LAN connected to transmit the processing result from the node to a predetermined terminal provided on an external side of the multiplexing system and connecting each pair of processing devices of the first system and the second system, and each processing device of the first system and the second system includes a survival monitoring unit configured to monitor a failure of the each processing device or the each LAN based on a device time-out for confirming survival of the each processing device and a route time-out for confirming survival of the each LAN set to be longer than the device time-out.

According to the aspect of the invention, it is possible to detect a route failure and a device failure in a short time without erroneous recognition.

BRIEF DESCRIPTION OF THE DRAWINGS

FIG. 4 is a diagram showing an example of a survival information table.

FIG. 5 is a diagram showing survival information transmitted and received via a LAN.

FIG. 7 is a flowchart of a processing of a survival information reception unit.

FIG. 8 is a diagram showing an example of a table showing a relationship between a failure site and an action taken at the time of a failure.

DESCRIPTION OF THE PREFERRED EMBODIMENTS

Figure 1:
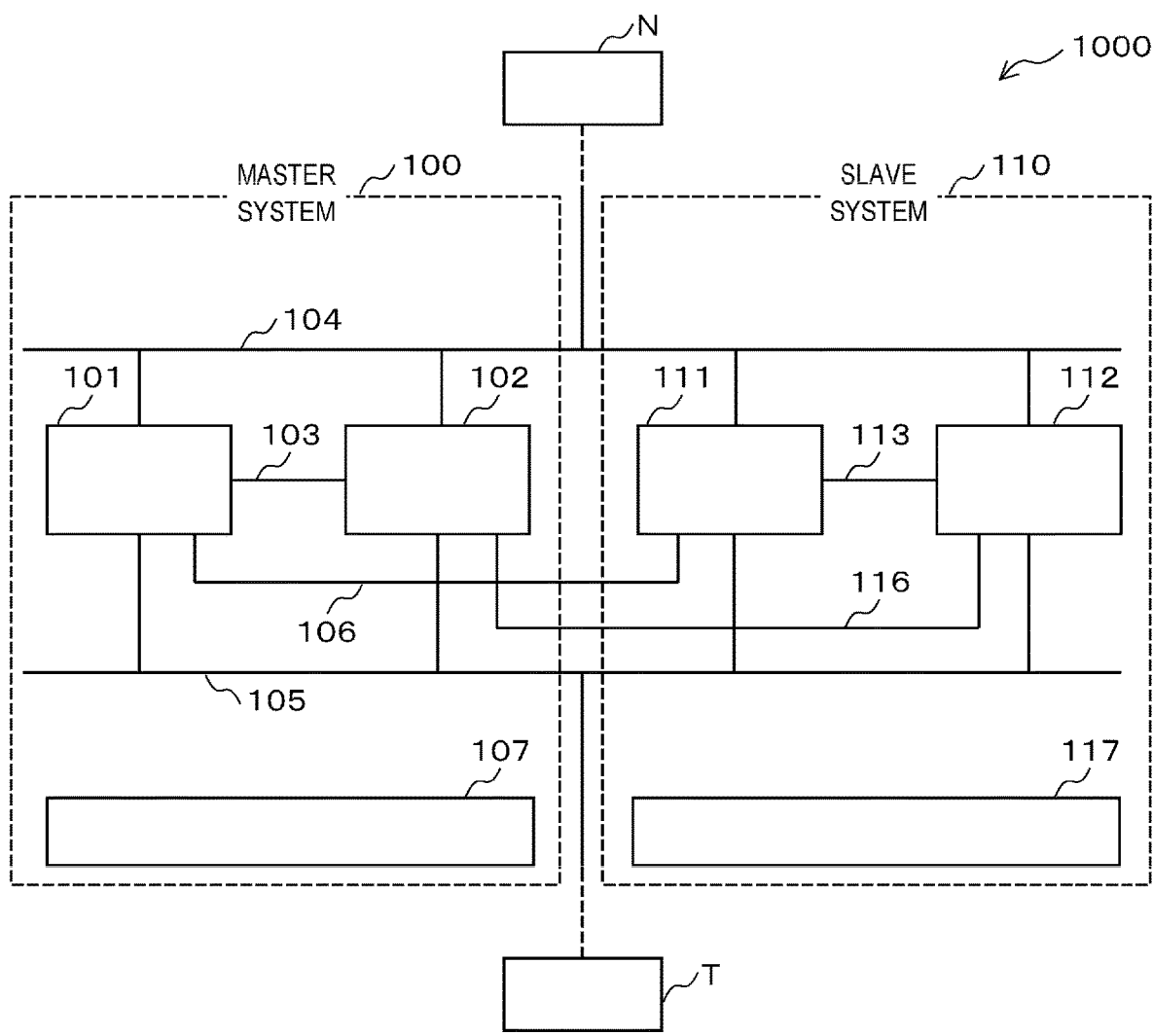
FIG. 1 is a configuration diagram of a typical multiplexing system.

Hereinafter, an embodiment of the invention will be described with reference to the drawings. The following description and drawings are examples for describing the invention, and are omitted and simplified as appropriate for clarification of the description. The invention can be implemented in various other forms. Unless otherwise limited, each component may be singular or plural.

In order to facilitate understanding of the invention, a position, a size, a shape, a range, or the like of each constituent element shown in the drawings may not represent an actual position, size, shape, range, or the like. Therefore, the invention is not necessarily limited to the position, size, shape, range, and the like disclosed in the drawings.

In the following description, although various types of information may be described in terms of expressions such as "table" and "list", the various types of information may be expressed by other data structures. "XX table", "XX list", and the like are referred to as "XX information" to indicate that information does not depend on a data structure. When identification information is described using expressions such as "identification information", "identifier", "name", "ID", and "number", the expressions may be replaced with each other.

When there are a plurality of constituent elements having a same or similar function, different subscripts may be attached to the same reference sign. However, when there is no need to distinguish the plurality of constituent elements, the subscripts may be omitted.

In the following description, a processing performed by executing a program may be described. The program is executed by a processor (for example, a central processing unit (CPU) or a graphics processing unit (GPU)) to perform a predetermined processing using a storage resource (for example, a memory) and/or an interface device (for example, a communication port), or the like as appropriate. Therefore, the processor may serve as a subject of the processing. Similarly, the subject of the processing performed by executing the program may be a controller, device, system, computer, or node including a processor. The subject of the processing performed by executing the program may be a calculation unit, and may include a dedicated circuit (for example, a field-programmable gate array (FPGA) or an application specific integrated circuit (ASIC)) that performs a specific processing.

The program may be installed from a program source into a device such as a computer. The program source may be, for example, a program distribution server or a computer-readable storage medium. When the program source is the program distribution server, the program distribution server may include a processor and a storage resource that stores a program to be distributed, and the processor of the program distribution server may distribute the program to be distributed to another computer. Two or more programs may be implemented as one program, or one program may be implemented as two or more programs in the following description.

First Embodiment

FIG. 1 is a diagram showing an example of a control system 1000 of a multiplexing system according to the present embodiment. As shown in FIG. 1, the control system 1000 includes a master system 100 and a slave system 110, which are systems that are multiplexed in two systems. In the following, a case where the control system 1000 is implemented by four processing devices is illustrated, but the invention is not limited thereto, and may be implemented as a system including a larger number of processing devices.

The master system 100 includes a processing device 101 and a processing device 102 forming a pair, an inter-pair local area network (LAN) 103 connecting the both processing devices, and a power supply system 107 that supplies power to these devices. Each of the processing device 101 and the processing device 102 is connected to an internal LAN 104 which is a network on an internal side of the control system 1000. Each of the processing device 101 and the processing device 102 receives a processing result from a multiplexed computing node N connected to the internal LAN 104, and performs a majority voting processing on the received processing result. Each of the processing device 101 and the processing device 102 exchanges a result of the majority voting processing between the paired devices, and compares a result of the exchanged majority voting processing with a result of the majority voting processing performed by an own device. If there is no inconsistency between the two, the processing result from the computing node N that becomes a majority is transmitted to a terminal T, which is an external device, via an external LAN 105, which is a network connected to the control system 1000 on an external side.

The inter-pair LAN 103 is used for exchanging results of the majority voting processing and forcibly stopping processing devices forming a pair. An inter-system LAN 106 is used for survival monitoring, forcible stop, and detecting power-off of the other system. For the forcible stop, there is generally a method using a baseboard management controller (BMC) and a method using system switching control (LXP) as disclosed in JP-A-2007-58708. The forcible stop includes memory dump collection by non-maskable interrupt (NMI) input and hardware reset assertion, and the former is especially useful because it can leave information necessary for a failure cause analysis.

Since the inter-pair LAN 103 and the inter-system LAN 106 are directly connected LANs, they do not affect other networks even if a communication load is applied, and since there are few points of failure, they have a relatively high reliability configuration. As will be described below, due to characteristics of comparing the results of the majority voting processing between a pair, fallback and system switching at the time of a failure are performed in units of pairs. For example, if the processing device 102 detects a failure of the own device, the processing device 102 and the processing device 101 as a pair device thereof are stopped. At this time, since the stopped device is the device of the master system 100, the slave system 110 is transitioned to a new master system. For similar reason, a power supply system is also duplicated, and in the master system 100, the power supply system 107 is provided. In the following description, although the description is based on a premise that one power supply system is provided in each system, a power supply system may be provided in each device.

The inter-system LAN 106 is connected only to one processing device of the processing devices of the other system (for example, the processing device 101 of the master system 100 and a processing device 111 of the slave system 110), but due to a rule that the fallback is always performed in pairs, it can be said that the pair processing device is also normal if the own device is normal. Therefore, when the processing devices in a system is forcibly stopped using the inter-system LAN 106 or an inter-system LAN 116, the pair processing device in the other system can be stopped. Although each of the internal LAN 104 and the external LAN 105 is implemented as a single network in FIG. 1, the internal LAN 104 and the external LAN 105 may have a multiplexed configuration.

Figure 2:
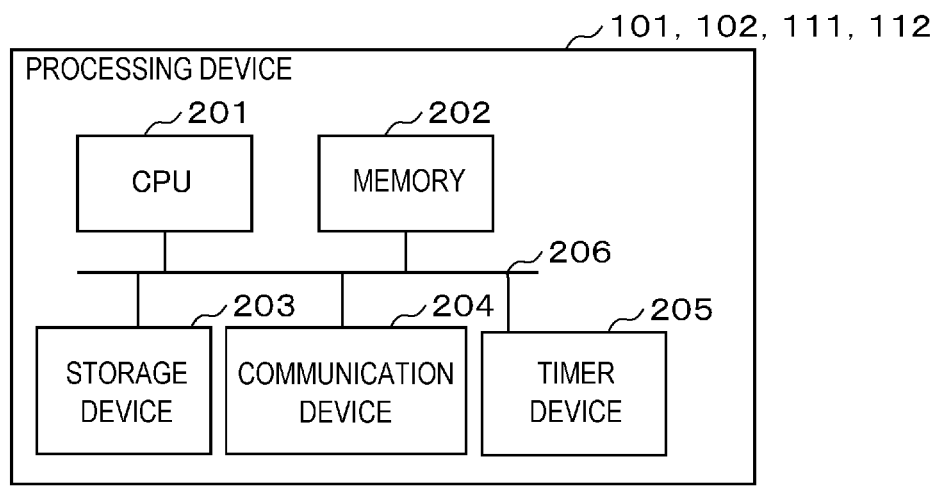
FIG. 2 is a hardware configuration diagram of devices in FIG. 1.

FIG. 2 is a diagram showing an example of a hardware configuration of each processing device. As shown in FIG. 2, each processing device includes an information processing device that is common as hardware such as a personal computer (PC) and a server, and includes a CPU 201, a memory 202, a storage device 203, a communication device 204, and a timer device 205, which are connected via a bus 206.

The CPU 201 is a general processor as hardware, and mainly reads and executes a program from the memory 202 to implement various functions in the present system.

The memory 202 is a general storage medium as hardware, and mainly stores a program executed by the CPU 201 and various types of data necessary for execution of the program.

The storage device 203 is a general disk as hardware, and mainly stores various types of data used in the present system, including data executed and output by the program above and data input to the program above.

The communication device 204 is a general communication device as hardware, and mainly transmits and receives various types of data to and from the processing device via the inter-pair LAN 103, the internal LAN 104, the external LAN 105, and the inter-system LAN 106.

The timer device 205 is a general timer as hardware, and mainly counts a survival time and a time-out of the processing device.

Figure 3:
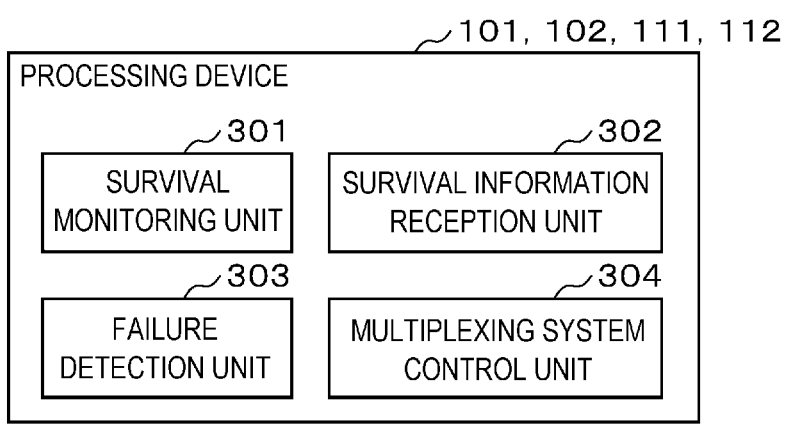
FIG. 3 is a software configuration diagram of the devices in FIG. 1.

FIG. 3 is a diagram showing a functional configuration example of each processing device. As shown in FIG. 3, each processing device functionally includes a survival monitoring unit 301, a survival information reception unit 302, a failure detection unit 303, and a multiplexing system control unit 304.

The survival monitoring unit 301 is a processing unit that monitors survival of the own device, the processing device and the LAN as a monitoring target. A specific processing performed by the survival monitoring unit 301 will be described later with reference to FIG. 6.

The survival information reception unit 302 is a processing unit that receives survival information from the processing device and the LAN as the monitoring target. A specific processing performed by the survival information reception unit 302 will be described later with reference to FIG. 7.

The failure detection unit 303 is a processing unit that detects a hardware failure and a software failure of the own device. Specifically, as will be described later, when a failure in which an operation of the processing device cannot be continued is detected, a pair in an own system is stopped.

The multiplexing system control unit 304 is a processing unit that executes an action according to a failure site. When a failure occurs in the own device to make the own device stop, the processing device to be paired with the own device is stopped, or when the processing device in which the failure occurs is a processing device belonging to the slave system, the slave system is switched to the master system. A specific processing performed by the multiplexing system control unit 304 will be described later with reference to FIG. 8.

Functions of the respective units included in each processing device are implemented by, for example, the CPU 201 reading a program from a read only memory (ROM) constituting the memory 202, reading and writing from and to a random access memory (RAM) constituting the memory 202, and executing a processing. The program may be provided by being read from a storage medium such as a universal serial bus (USB) memory or downloaded from another computer via a network.

FIG. 4 is a diagram showing an example of a survival information table 401 stored in a storage device of each processing device. The survival information table 401 is a table in which conditions for determining that each processing device and LAN as the monitoring target survives are defined. In FIG. 4, as an example, the survival information table 401 stored in the processing device 101 is shown, but the survival information table 401 is similarly stored in all processing devices and LANs constituting the present system.

As shown in FIG. 4, in the survival information table 401, a monitoring target, a survival time that is a time count value for determining that the monitoring target survives, a monitoring cycle that defines a cycle for monitoring the monitoring target, and a time-out counter that is a threshold for determining that a failure occurs in the monitoring target are stored in association with each other. FIG. 4 shows that, for example, a current counter value, which is the survival time of the processing device 101 as the own device, is "10". The counter value is counted by the survival monitoring unit 301.

Regarding the processing device 102 paired with the processing device 101, current counter values, which are the survival times for the processing device 102, the inter-pair LAN 103 between the processing device 101 and the processing device 102, the internal LAN 104, and the external LAN 105 being "8", "8", "5", and "5" respectively are shown. Further, cycles for monitoring these devices and LANs being "2", "2", "5", and "10" respectively are shown.

As will be described later, the survival monitoring unit 301 counts up a count value indicating the survival time one by one, and transmits the survival information including the counted up new survival time to the monitoring target at a predetermined monitoring cycle as a proof that the own device survives. For example, when the survival time of the own device 101 is "10", "12", "14", and so on, the own device 101 transmits the survival information including the survival time to the inter-pair LAN 103 of the device 102 as the monitoring target. Similarly, when the survival time is "10", "15", "20", and so on, the survival information is transmitted to the internal LAN 104.

Further, the table shows initial values of the time-out counter for monitoring these devices and LANs are "14", "20", "40", and "80", respectively, and current values thereof are "12", "18", "35", and "75", respectively. As will be described later, when receiving the survival information of the new survival time for the processing device or the LAN as the monitoring target, the survival information reception unit 302 resets a corresponding time-out counter to the initial value. On the other hand, when it is determined that a time-out counter of the monitoring target is not "0", the survival monitoring unit 301 counts down the time-out counter by "1". That is, when the survival information including the new survival time updated to a latest value is not received, the survival monitoring unit 301 decreases a value of the time-out counter as time elapses. When the value reaches "0", it is considered that a failure occurs in the monitoring target, and the multiplexing system control unit 304 takes an action according to the failure site.

The survival time may be a real time or a virtual time (for example, a counter that increases in a fixed cycle) if the timer device 205 is a monophonic clock. As will be described later, the survival monitoring unit 301 updates the "survival time" of the own device at any time in the monitoring cycle, stores the updated "survival time" in survival information shown in FIG. 5, and transmits the stored survival information to another processing device via each LAN.

FIG. 5 is a diagram showing an example of survival information 501 stored in the storage device of each processing device. As shown in FIG. 5, in the survival information 501, a processing device serving as a transmission source of the survival information and a current counter value, which is the survival time, are stored in association with each other. In FIG. 5, as an example, the survival information 501 transmitted by the processing device 101 is shown, but the survival information is also similarly transmitted by all the processing devices constituting the present system.

In FIG. 5, for example, the processing device 101 as the transmission source and the current survival time "10" stored in the survival information table 401 of the processing device 101 are stored and transmitted to another processing device.

In the survival information table 401 shown in FIG. 4, the monitoring cycle can be set longer in order to reduce an influence of a network load due to communication for monitoring the survival of the external LAN as the monitoring target. For the value of the time-out counter of the survival information table 401, by setting a value of the time-out counter of each LAN connected to the pair processing device to be larger than a value of the time-out counter of the pair processing device, and setting a value of the time-out counter of each LAN connected to the processing device of the other system to be larger than a value of the time-out counter of the processing device of the other system, it is possible to avoid erroneously recognizing a LAN failure as a device failure. Accordingly, it is possible to take an appropriate action in accordance with the LAN failure or the device failure. A value of the time-out counter of the processing device of the other system is set to be larger than a value of the time-out counter of the paired processing device, and failure detection and the fallback in units of pairs and a system switching processing are prioritized. As will be described later, the time-out for monitoring the survival of the processing device belonging to the other system is accompanied by forcible stop of the processing device forming the pair in the other system. When forcibly stopped, information necessary for a failure analysis such as storage of various logs may be lost, and in order to avoid such a situation as much as possible, fallback in units of pairs is prioritized. According to such control, logs can be stored without problems for at least one of normal devices of a fallback pair.

Figure 6:
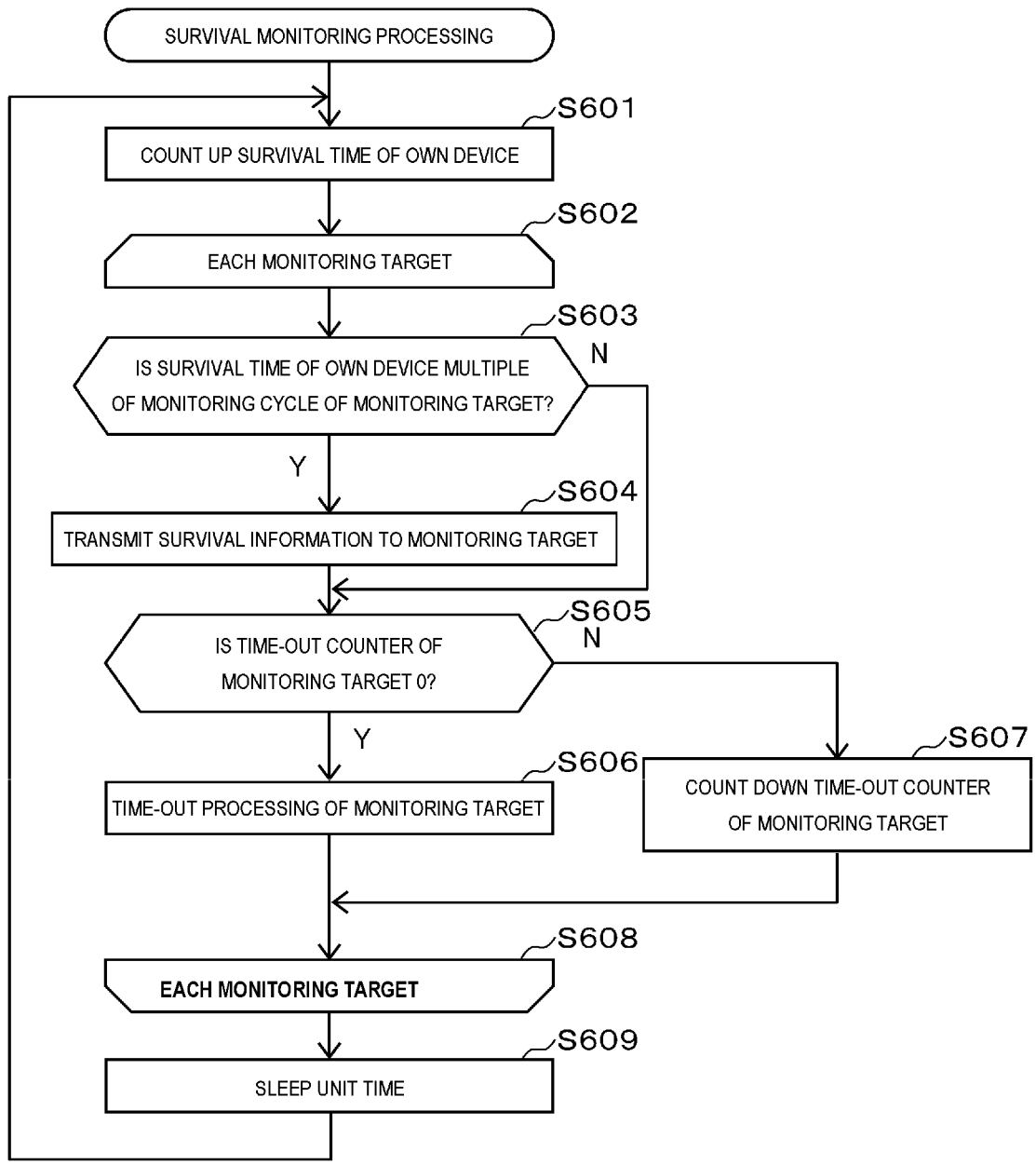
FIG. 6 is a flowchart of a processing of a survival monitoring unit.

FIG. 6 is a flowchart showing a processing procedure of a survival monitoring processing performed by the survival monitoring unit 301 of each processing device. As shown in FIG. 6, the survival monitoring unit 301 reads the survival time of the own device counted up by the timer device 205 (for example, +1) (S601), and executes each of the steps of S602 to S608 for each monitoring target.

The survival monitoring unit 301 determines whether the survival time of the own device counted up in S601 becomes a multiple of the monitoring cycle of the monitoring target (S603). For example, in the survival information table 401 shown in FIG. 4, when the survival time of the processing device 101 is counted up to "10", it is determined that the survival time of the processing device 101 is a multiple (5 times) of the monitoring cycle "2" of the processing device 102 as the monitoring target.

When it is determined that the survival time of the own device counted up in S601 is a multiple of the monitoring cycle of the monitoring target (S603: Yes), the survival monitoring unit 301 transmits the counted-up survival information of the own device (FIG. 5) to the monitoring target (S604). On the other hand, when the survival monitoring unit 301 determines that the survival time of the own device counted up in S601 is not a multiple of the monitoring cycle of the monitoring target (S603: No), the processing proceeds to S605 without making any action.

Further, the survival monitoring unit 301 determines whether the current value of the time-out counter of the monitoring target stored in the survival information table 401 is 0 (S605). When it is determined that the current value of the time-out counter of the monitoring target stored in the survival information table 401 is 0 (S605: Yes), the survival monitoring unit 301 determines that the time-out of the monitoring target is detected, and executes a time-out processing (FIG. 8) of the monitoring target (S606). When the time-out processing is executed, the system switching is performed.

On the other hand, when it is determined that the current value of the time-out counter of the monitoring target stored in the survival information table 401 is not 0 (S605: No), the survival monitoring unit 301 counts down the value of the time-out counter of the monitoring target from the current value (for example, −1) (S607).

When the processing of S602 to S608 is executed for each monitoring target, the survival monitoring unit 301 sleeps (waits) until a next survival time as a unit time (S609). When the processing of S609 ends, the processing returns to S601 to repeat the subsequent processing.

FIG. 7 is a flowchart showing a processing procedure of a survival information reception processing performed by the survival information reception unit 302 of each processing device. As shown in FIG. 7, the survival information reception unit 302 acquires a record stored in the survival information table 401 corresponding to the processing device and the LAN as the monitoring target based on the received survival information (S701).

The survival information reception unit 302 determines, for the monitoring target included in the acquired record, whether a survival time of the processing device included in the received survival information is newer than a survival time stored in the survival information table 401 (S702), and when it is determined that the survival time of the processing device included in the received survival information is newer than the survival time stored in the survival information table 401 (S702: Yes), the survival information reception unit 302 sets the current value of the time-out counter of the processing device corresponding to the monitoring target to the initial value, and updates the survival time of the monitoring target stored in the survival information table 401 to the survival time included in the received survival information (S703). On the other hand, when it is determined that the survival time of the processing device included in the received survival information is not newer than the survival time stored in the survival information table 401 (S702: No), the survival information reception unit 302 proceeds to S704 without making any action.

Further, the survival information reception unit 302 determines, for the monitoring target included in the acquired record, whether a survival time of a route (LAN) included in the received survival information is newer than a survival time stored in the survival information table 401 (S704), and when it is determined that the survival time of the LAN included in the received survival information is newer than the survival time stored in the survival information table 401 (S704: Yes), the survival information reception unit 302 sets the current value of the time-out counter of the LAN corresponding to the monitoring target to the initial value, and updates the survival time of the monitoring target stored in the survival information table 401 to the survival time included in the received survival information (S705). On the other hand, when it is determined that the survival time of the LAN included in the received survival information is not newer than the survival time stored in the survival information table 401 (S704: No), the survival information reception unit 302 ends the processing without making any action.

FIG. 8 is a diagram showing an example of an action determination table 801 corresponding to a failure site stored in a storage device of each processing device. As shown in FIG. 8, in the action determination table 801, a failure site and an action to be taken when a failure occurs in the site are stored in association with each other. The LAN failure shown in FIG. 8 includes both a case where a failure is explicitly detected by a link-down or the like and a case where a failure is detected by a survival monitoring time-out. Since actions at the time of occurrence of each LAN failure are different depending on use of the LAN, an example thereof is shown in FIG. 8.

When the failure detection unit 303 of the own device detects a failure site of the own device, the multiplexing system control unit 304 of the processing device as the own device refers to an own device record 8011 in the action determination table 801, and stops the pair in the own system as an action corresponding to the own device that is the failure site. For example, when the failure detection unit 303 of the processing device 101 as the own device detects a failure site of the own device, the multiplexing system control unit 304 of the processing device 101 stops the processing device 102 and the processing device 101 forming the pair in the own system.

When a failure site of the processing device forming a pair with the own device is detected, the multiplexing system control unit 304 of the processing device as the own device refers to a pair device record 8012 of the action determination table 801, and forcibly stops the pair device and stops the own device as an action corresponding to the pair device that is the failure site. For example, when the failure detection unit 303 of the processing device 101 as the own device detects a time-out of the pair processing device 102, the multiplexing system control unit 304 of the processing device 101 forcibly stops the pair processing device 102 and autonomously stops the processing device 101 as the own device.

When a failure site of the inter-pair LAN between the own device and the processing device forming the pair is detected, the multiplexing system control unit 304 of the processing device as the own device refers to the pair device record 8012 of the action determination table 801, and stops the own device and the pair processing device as an action corresponding to the inter-pair LAN that is the failure site. For example, when the failure detection unit 303 of the processing device 101 as the own device or the failure detection unit 303 of the processing device 102 as the paired processing devices detects a failure of the inter-pair LAN 103 between them, the multiplexing system control unit 304 of the processing device 101 and the multiplexing system control unit 304 of the pair processing device 102 autonomously stop the own device.

When a failure site of the internal LAN or the external LAN is detected between the own device and the processing device forming the pair, the multiplexing system control unit 304 of the processing device as the own device stops the own device and the pair processing device similarly as the action corresponding to the inter-pair LAN described above.

Further, when a failure site of the processing device of the other system other than the system including the own device and the processing device forming the pair is detected, the multiplexing system control unit 304 of the processing device as the own device refers to another system device record 8013 in the action determination table 801, and forcibly stops paired devices in the other system as an action corresponding to the device in the other system that is the failure site. For example, when the failure detection unit 303 of the processing device 111 or the processing device 112 paired with the processing device 111 in the slave system detects a time-out of the processing device 101 in the processing devices forming the pair in the master system, the multiplexing system control unit 304 of the processing device 111 of the slave system forcibly stops the processing device 101 of the master system, while the multiplexing system control unit 304 of the processing device 112 of the slave system forcibly stops the processing device 102 in the master system.

When a failure site of the inter-system LAN between the processing device as the own device and the processing device of the other system is detected, the multiplexing system control unit 304 of the processing device as the own device refers to the other device system record 8013 in the action determination table 801. However, since "–" is stored in the record indicating that no countermeasure is to be taken, no countermeasure is taken for the failure. For example, when a disconnection occurs in the inter-system LAN 106 and the failure detection unit 303 of either the processing device 101 of the master system or the processing device 111 of the slave system detects the link-down, the fallback or the system switching is not performed immediately. A reason for this is that when the survival monitoring unit 301 of the processing device 101 of the master system detects the survival monitoring time-out of the processing device 111 of the slave system, it is impossible to forcibly stop the processing device 111 of the slave system from the processing device 101 of the master system due to the above disconnection. For example, when the system switching is performed, there may be a risk that both systems become the master system.

Therefore, when the link-down is detected, in order to avoid such a risk, the multiplexing system control unit 304 of the processing device 101 of the master system autonomously stops the own device.

In this case, if one processing device (for example, the processing device 112) of the processing devices of the pair in the slave system survives, by setting the survival information table 401 shown in FIG. 4, one processing device of the above processing devices first detects the survival monitoring time-out of the pair processing device (for example, the processing device 111), and forcibly stops the pair processing device by the inter-pair LAN (for example, the inter-pair LAN 113). Therefore, it can be said that a probability of autonomous stop to avoid the risk of both systems becoming the master systems mentioned above is sufficiently low.

When a failure site of the internal LAN between the processing device as the own device and the processing device of the other system is detected, the multiplexing system control unit 304 of the processing device as the own device refers to the other system device record 8013 in the action determination table 801, and forcibly stops or autonomously stops the pair device in the other system as an action corresponding to the internal LAN that is the failure site. For example, when the survival monitoring time-out of the internal LAN 104 between the processing device 101 and the processing device 111 of the slave system is detected, the survival monitoring unit 301 of the processing device 101 of the master system outputs a stop request to the pair device in the slave system via any LAN (for example, via the external LAN 105), and in accordance with the stop request, autonomously stops the processing device 111 and the processing device 112 forming the pair in the slave system. Alternatively, when the processing device 111 of the slave system detects the survival monitoring time-out of the internal LAN 104 between the processing device 111 and the processing device 101 of the master system, the processing device 111 of the slave system issues a stop request to the processing device 112 forming the pair, and autonomously stops the own device.

When a failure site of the external LAN and the processing device as the own device and the processing device of the other system is detected, the multiplexing system control unit 304 of the processing device as the own device refers to the other system device record 8013 in the action determination table 801. However, since "–" is stored in the record indicating that no countermeasure is to be taken, no countermeasure is taken for the failure, but similar countermeasure as for the above internal LAN may be taken.

As described above, in the present system, by transmitting and receiving the survival information of each processing device using the internal LAN, it is possible to continue processing at the time of the system switching, so that it is targeted for the fallback and the system switching at the time of an internal LAN failure. In a case of an inter-system LAN failure, both systems can operate normally, but the slave system, which has little effect, is stopped. For the LAN failure that does not directly affect an operation of each processing device, such as an external LAN, the fallback and the system switching is not performed.

In the action determination table 801 shown in FIG. 8, the description is based on a premise that each LAN is one, but each LAN may be multiplexed. For example, in a case where the internal LAN 104 is duplicated, even if a failure is detected only in a LAN in one system, since a LAN in the other system can be used, it is not necessary to take an action. When either one of the LANs of the two systems is detected as a failure, an action as shown in FIG. 8 may be taken.

When a pair processing device or a processing device in the other system detects a failure of the own device and autonomously stops functioning, it notifies that a function has stopped via each LAN, but there is no such notification and no response when a survival monitoring time-out of the pair processing device or the processing device in the other system is detected. In this case, since it is unclear whether the processing device is completely stopped or a part of functions is still valid, the system switching is performed after the forcible stop as shown in FIG. 8 to avoid malfunctions such as split brain where both systems are master systems. On the contrary, when a notification of autonomous stop of function is received, the processing device is controlled not to forcibly stop. A reason is that if the forcible stop is performed, an OS also is stopped, making it difficult to collect information for investigating a cause of the failure.

A stop request may be sent to a target processing device via any LAN and it may be waited for the forcible stop until a notification that the function stops is received from the processing device. Accordingly, unnecessary forcible stop may be avoided. In this case, if the target processing device cannot accept the stop request, the target processing device is forcibly stopped after a waiting time for receiving the notification that the above function has stopped timed out, and a time until the system switching is extended. Therefore, if such a situation is acceptable, the control may be performed.

Figures 9, 10:
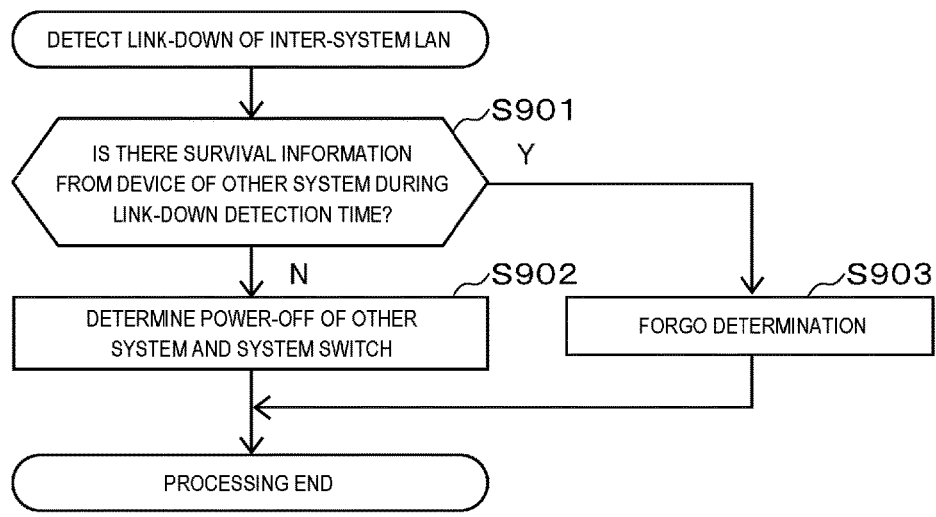
FIG. 9 is a flowchart of a power-off determination processing due to a link-down.
FIG. 10 is a diagram showing another example of the survival information table in survival monitoring.

FIG. 9 is a flowchart showing a processing procedure of a link-down detection processing in which the failure detection unit 303 of each processing device detects a link-down of the inter-system LAN and the multiplexing system control unit 304 switches the systems. In general, it takes hundreds of ms to detect the link-down. Here, based on a premise that a link-down detection time is sufficiently shorter than the survival monitoring time-out of the processing device of the other system, the power-off of the processing device of the other system is detected early, and the system switching is performed.

As shown in FIG. 9, the multiplexing system control unit 304 of each processing device determines whether the survival information reception unit 302 receives the survival information from the processing device of the other system during a time period when the link-down of the inter-system LAN is detected by the failure detection unit 303 (S901). For example, when the link-down of the inter-system LAN 106 is detected by the failure detection unit 303, the multiplexing system control unit 304 of the processing device 101 of the master system determines whether the survival information reception unit 302 receives the survival information of the processing device 111 of the other system via the internal LAN 104 or the external LAN 105 other than the inter-system LAN 106 during the time period when the link-down is detected.

When it is determined that the survival information reception unit 302 receives the survival information from the processing device of the other system during the time period when the link-down of the inter-system LAN is detected by the failure detection unit 303 (S901: Yes), the multiplexing system control unit 304 of each processing device receives the survival information via another LAN, so that the multiplexing system control unit 304 forgoes a determination of the power-off of the processing device of the other system (S903), and ends the processing. For example, when it is determined that the survival information reception unit 302 receives the survival information of the processing device 111 of the other system via the internal LAN 104 or the external LAN 105 during the time period when the link-down of the inter-system LAN 106 is detected by the failure detection unit 303, the processing device 111 survives, so that the multiplexing system control unit 304 of the processing device 101 of the master system forgoes the determination of the power-off.

On the other hand, when it is determined that the survival information reception unit 302 does not receive the survival information of the processing device of the other system during the time period when the link-down of the inter-system LAN is detected by the failure detection unit 303 (S901: No), the multiplexing system control unit 304 of each processing device determines that the processing device of the other system is in a power-off state, performs the system switching (S902), and ends the processing.

When there are a plurality of inter-system LANs or when the link-down is detected periodically, it is possible to further reduce erroneous detection of the power-off of the processing device of the other system by determining that whether the survival information reception unit 302 receives the survival information from the processing device of the other system based on the longest time among times when the link-down of the inter-system LAN is detected. That is, based on the longest link-down time, if even one piece of survival information can be received within that time, it can be determined that power-off of the system to which the inter-system LAN is connected does not occur, so that it is possible to detect the power-off more accurately than when the link-down is detected based on a short time.

When the determination of the power-off of the processing device of the other system is forgone in step S903, the present processing may be executed again after a predetermined period of time, and whether the power-off of the device occurs may be checked. When the power-off actually occurs, the "condition" of S901 is satisfied (S901: No), and it is determined that the power-off occurs. On the other hand, if it is a mere failure of the inter-system LAN, the survival monitoring unit 301 detects the survival monitoring time-out of the inter-system LAN. As described above, when it is determined that the power-off of the processing device of the other system occurs, the system switching can be performed in step S902 without waiting for the survival monitoring time-out or the forcible stop of the processing device of the other system. Accordingly, a time of the system switching can be shortened. Although FIG. 9 shows a case where the link-down is detected, in addition to this, the similar can be applied a case of detecting a power supply interruption by Power over Ether (PoE).

As described above, in the control system 1000 of the multiplexing system, the multiplexing system includes: a first system (for example, the master system 100) having a pair of processing devices (for example, the processing device 101 and the processing device 102) forming a pair; a second system (for example, the slave system 110) having a pair of processing devices forming a pair (for example, the processing device 111 and the processing device 112) that are different from the first system; a first inter-pair LAN (for example, the inter-pair LAN 103) directly connecting the pair of processing devices of the first system; a second inter-pair LAN (for example, the inter-pair LAN 113) directly connecting the pair of processing devices of the second system, a first inter-system LAN (for example, the inter-system LAN 106) directly connecting one processing device (for example, the processing device 101) of the pair of processing devices of the first system and one processing device (for example, the processing device 111) of the pair of processing devices of the second system; a second inter-system LAN (for example, the inter-system LAN 116) directly connecting the other processing device (for example, the processing device 102) of the pair of processing devices of the first system and the other processing device (for example, the processing device 112) of the pair of processing devices of the second system; an internal LAN (for example, the internal LAN 104) connected to receive a processing result from a computing node (for example, the computing node N) provided on an internal side of the multiplexing system and perform a predetermined processing (for example, the majority voting processing) and connecting each pair of processing devices of the first system and the second system; and an external LAN (for example, the external LAN 105) connected to transmit the processing result from the computing node to a predetermined terminal (for example, the terminal T) provided on an external side of the multiplexing system and connecting each pair of processing devices of the first system and the second system, and the survival monitoring unit 301 is configured to, in each processing device of the first system and the second system, monitor a failure of the each processing device or the each LAN based on a device time-out for confirming survival of the each processing device and a route time-out for confirming survival of the each LAN set to be longer (larger value) than the device time-out, so that it is possible to detect a route failure and a device failure in a short time without erroneous recognition.

The each processing device of the first system and the second system includes the survival information reception unit 302 that receives survival information (for example, the survival information 501) including a survival time of an own device for determining the device time-out or the route time-out from the other processing device, and updates a survival time of the other processing device or the each LAN included in the received survival information to a latest value, and the survival monitoring unit 301 transmits the survival information including the survival time (for example, the survival time in the survival information table 401) of the own device to the each processing device via the each LAN, and determines occurrence of the failure by not updating the survival time of the other processing device or the each LAN included in the survival information received by the survival information reception unit 302 to the latest value, so that each processing device can passively detect a route failure and a device failure in a short time without erroneous recognition.

The processing devices directly connected via the first inter-system LAN in the first system and the second system each include a first failure detection unit (for example, the failure detection unit 303) that detects a link-down of the first inter-system LAN, the processing devices directly connected via the second inter-system LAN in the first system and the second system each include a second failure detection unit (for example, the failure detection unit 303) that detects a link-down of the second inter-system LAN, and for example, as shown in FIG. 9, the multiplexing system control unit 304 is configured to determine whether the survival information reception unit 302 receives survival information of the processing device of the other system via a LAN other than a LAN in which the link-down is detected during a time period when the link-down is detected by the first failure detection unit or the second failure detection unit, determine that, when it is determined that the survival information is not received via the LAN other than the LAN in which the link-down is detected during the time period, the processing device of the other system is in a power-off state, and switch the system, so that it is possible to reduce erroneous detection of the power-off.

In the above example, the survival information transmitted when the link-down is detected is transmitted by each processing device at the time when the link-down is detected. However, depending on a communication status of the LAN, a transmission timing of the survival information and communication of other data may overlap, resulting in an excessive load. Therefore, an example of receiving the survival information in consideration of a load on the LAN will be described.

FIG. 10 is a diagram showing an example of a survival information table 1001 in consideration of the load on the LAN. As shown in FIG. 10, in the survival information table 1001, an offset is added with respect to the survival information table 401 shown in FIG. 4. The offset is information indicating a time difference for transmitting the survival information at different timings. For example, a case where it takes 300 ms to detect a link-down and there are five LANs as paths for transmitting the survival information is considered. In this case, the time 300 ms required to detect the link-down is divided into 5 equal parts, and survival information is transmitted from each processing device by shifting the time by 60 ms. That is, a transmission time of the first survival information of each LAN is 0 ms (offset 0), 60 ms (offset 1), 120 ms (offset 2), 180 ms (offset 3), 240 ms (offset 4), and after that, the survival information is transmitted in the monitoring cycle for each LAN. In the present example, the case where the time required for the detection of the link-down is equally divided has been illustrated, but the offset may be set prorated according to the communication status of each LAN.

Figure 11:
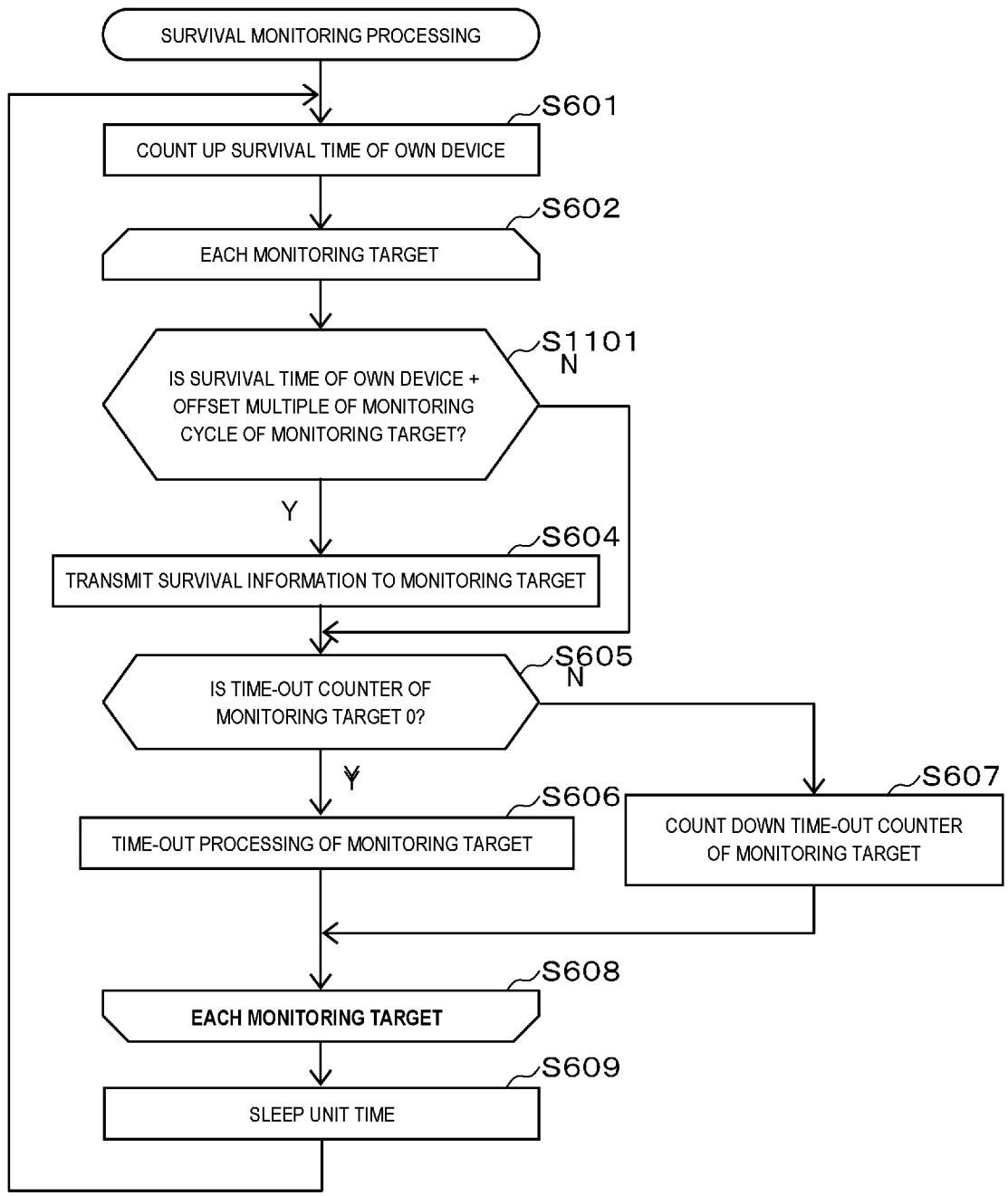
FIG. 11 is another flowchart of the processing of the survival monitoring unit.

FIG. 11 is a flowchart showing a processing procedure of a survival monitoring processing performed by the survival monitoring unit 301 of each processing device using the survival information table 1001 shown in FIG. 10. In FIG. 10, since a determination step during transmitting the survival information is different from that in FIG. 6, the determination step is described, other steps are denoted by the same reference signs, and a description thereof will be omitted.

In step S1101, the survival monitoring unit 301 determines whether a value obtained by adding the offset to the survival time of the own device counted up in S601 becomes a multiple of the monitoring cycle of the monitoring target (S603). When it is determined that the value obtained by adding the offset to the survival time of the own device counted up in S601 is a multiple of the monitoring cycle of the monitoring target (S603: Yes), the survival monitoring unit 301 transmits the counted-up survival information of the own device (FIG. 5) to the monitoring target (S604). On the other hand, when the survival monitoring unit 301 determines that the value obtained by adding the offset to the survival time of the own device counted up in S601 is not a multiple of the monitoring cycle of the monitoring target (S603: No), the processing proceeds to S605 without making any action.

As described above, the survival monitoring unit 301 transmits the survival information to each processing device via each LAN based on a value obtained by adding an offset indicating a time difference for transmitting the survival information at different timings to the survival time of the own device, which reduces a risk of erroneously recognizing an inter-system LAN failure as a power-off of the other system without imposing an extra communication load. That is, even when some packet loss or transmission and reception delay occurs, it is possible to increase a possibility that the survival information can be received from any LAN during the link-down detection time of the inter-system LAN.

What is claimed is:

1. A control system of a multiplexing system, the multiplexing system including:
    a first system having a pair of processing devices forming a pair;
    a second system having a pair of processing devices forming a pair that are different from the first system;
    a first inter-pair LAN directly connecting the pair of processing devices of the first system;
    a second inter-pair LAN directly connecting the pair of processing devices of the second system;
    a first inter-system LAN directly connecting one processing device of the pair of processing devices of the first system and one processing device of the pair of processing devices of the second system;
    a second inter-system LAN directly connecting another processing device of the pair of processing devices of the first system and another processing device of the pair of processing devices of the second system;
    an internal LAN connected to receive a processing result from a computing node provided on an internal side of the multiplexing system and perform a predetermined processing and connecting each pair of processing devices of the first system and the second system; and
    an external LAN connected to transmit the processing result from the computing node to a predetermined terminal provided on an external side of the multiplexing system and connecting each pair of processing devices of the first system and the second system, wherein
    each processing device of the first system and the second system includes a survival monitoring unit configured to monitor a failure of the each processing device or the each LAN based on a device time-out for confirming survival of the each processing device and a route time-out for confirming survival of the each LAN set to be longer than the device time-out.

2. The control system according to claim 1, wherein
    the each processing device of the first system and the second system includes a survival information reception unit configured to receive survival information including a survival time of an own device for determining the device time-out or the route time-out from the other processing device, and update a survival time of the other processing device or the each LAN included in the received survival information to a latest value, and
    the survival monitoring unit transmits the survival information including the survival time of the own device to the each processing device via the corresponding LAN, and determines occurrence of a failure by not updating the survival time of the other processing device or the each LAN included in the survival information received by the survival information reception unit to the latest value.

3. The control system according to claim 2, wherein
    the processing devices directly connected via the first inter-system LAN in the first system and the second system each include a first failure detection unit configured to detect a link-down of the first inter-system LAN,
    the processing devices directly connected via the second inter-system LAN in the first system and the second system each include a second failure detection unit configured to detect a link-down of the second inter-system LAN, and
    a multiplexing system control unit, which is configured to determine whether the survival information reception unit receives survival information of the processing device of the other system via a LAN other than a LAN in which the link-down is detected during a time period when the link-down is detected by the first failure detection unit or the second failure detection unit, determine that, when it is determined that the survival information is not received via the LAN other than the LAN in which the link-down is detected during the time period, the processing device of the other system is in a power-off state, and switch the system, is included.

4. The control system according to claim 2, wherein
    the survival monitoring unit transmits the survival information to the each processing device via the corresponding LAN based on a value obtained by adding an offset indicating a time difference for transmitting the survival information at different timings to the survival time of the own device.

5. A control method performed in a control system of a multiplexing system, the control method comprising:
    in each processing device of a first system having a pair of processing devices forming a pair and a second system having a pair of processing devices forming a pair that are different from the first system in the multiplexing system,
    monitoring, by a survival monitoring unit, a failure of the each processing device or a LAN based on a device time-out for confirming survival of the each processing device and a route time-out for confirming survival of the each LAN set to be longer than the device time-out via any one of a first inter-pair LAN directly connecting the pair of processing devices of the first system, a second inter-pair LAN directly connecting the pair of processing devices of the second system, a first inter-system LAN directly connecting one processing device of the pair of processing devices of the first system and one processing device of the pair of processing devices of the second system, a second inter-system LAN directly connecting another processing device of the pair of processing devices of the first system and another processing device of the pair of processing devices of the second system, an internal LAN connected to receive a processing result from a computing node provided on an internal side of the multiplexing system and perform a predetermined processing and connecting each pair of processing devices of the first system and the second system, and an external LAN connected to transmit the processing result from the computing node to a predetermined terminal provided on an external side of the multiplexing system and connecting each pair of processing devices of the first system and the second system.

6. The control method according to claim 5, further comprising:

in the each processing device of the first system and the second system, transmitting survival information including a survival time of an own device for determining the device time-out or the route time-out to the each processing device via the each LAN by the survival monitoring unit;

receiving the survival information including the survival time of the own device from the other processing device by a survival information reception unit;

updating a survival time of the other processing device or the each LAN included in the received survival information to a latest value by the survival information reception unit; and determining occurrence of a failure by not updating the survival time of the other processing device or the each LAN included in the survival information received by the survival information reception unit to the latest value by the survival monitoring unit.

7. The control method according to claim 6, further comprising:

detecting a link-down of the first inter-system LAN by a first failure detection unit in respective processing devices directly connected via the first inter-system LAN in the first system and the second system;

detecting a link-down of the second inter-system LAN by the second failure detection unit in respective processing devices directly connected via the second inter-system LAN in the first system and the second system;

determining, by a multiplexing system control unit, whether the survival information reception unit receives survival information of the processing device of the other system via a LAN other than a LAN in which the link-down is detected during a time period when the link-down is detected by the first failure detection unit or the second failure detection unit; and determining that, by the multiplexing system control unit, when it is determined that the survival information is not received via the LAN other than the LAN in which the link-down is detected during the time period, the processing device of the other system is in a power-off state, and switching the system.

8. The control method according to claim 6, further comprising:

transmitting the survival information to the each processing device via the each LAN based on a value obtained by adding an offset indicating a time difference for transmitting the survival information at different timings to the survival time of the own device by the survival monitoring unit.

* * * * *